United States Patent
Nemoto et al.

(10) Patent No.: US 9,130,209 B2
(45) Date of Patent: Sep. 8, 2015

(54) ELECTRIC STORAGE APPARATUS INCLUDING INTER-ELECTRIC STORAGE DEVICE AIR PASSAGES BETWEEN ELECTRIC STORAGE DEVICES AND AIR VENT PORTION FORMED AT END OF ELECTRIC STORAGE DEVICES

(71) Applicant: LITHIUM ENERGY JAPAN, Kyoto-shi (JP)

(72) Inventors: Seiji Nemoto, Shiga (JP); Minoru Watanabe, Shiga (JP); Yoshihiro Masuda, Shiga (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 288 days.

(21) Appl. No.: 13/626,527

(22) Filed: Sep. 25, 2012

(65) Prior Publication Data

US 2013/0078488 A1 Mar. 28, 2013

(30) Foreign Application Priority Data

Sep. 27, 2011 (JP) ................................ 2011-211501
Sep. 4, 2012 (JP) ................................ 2012-194035

(51) Int. Cl.

| H01M 2/10 | (2006.01) |
|---|---|
| H01M 10/60 | (2014.01) |
| H01M 10/613 | (2014.01) |
| H01M 10/647 | (2014.01) |
| H01M 10/6556 | (2014.01) |

(Continued)

(52) U.S. Cl.
CPC .......... *H01M 2/1077* (2013.01); *H01M 10/613* (2015.04); *H01M 10/625* (2015.04); *H01M 10/647* (2015.04); *H01M 10/6563* (2015.04); *H01M 2220/20* (2013.01)

(58) Field of Classification Search
CPC .......... H01M 2/1077; H01M 10/5004; H01M 10/5032; H01M 10/5067; H01M 10/5016
USPC .......................................................... 429/82
See application file for complete search history.

(56) References Cited

U.S. PATENT DOCUMENTS

| 6,437,537 B2 * | 8/2002 | Park ............................. 320/107 |
| 2006/0216582 A1 | 9/2006 | Lee et al. |

(Continued)

FOREIGN PATENT DOCUMENTS

| EP | 2 437 329 A1 | 4/2012 |
| JP | 2009-181896 A | 8/2009 |

(Continued)

OTHER PUBLICATIONS

Extended European Search Report dated Feb. 4, 2013.

*Primary Examiner* — Sean P Cullen
(74) *Attorney, Agent, or Firm* — McGinn IP Law Group, PLLC

(57) ABSTRACT

An electric storage apparatus includes a holder for holding a plurality of electric storage devices. An inter-electric storage device air passage is formed between the electric storage devices. A holder body of the holder includes: at least one wall portion extending in a second direction, the at least one wall portion being opposed from outside to an electric storage device located at one end in a first direction among the plurality of electric storage devices; and an air vent portion formed side by side with the wall portion in a third direction orthogonal to the first and second directions, the air vent portion being opened to the first and second directions.

15 Claims, 10 Drawing Sheets

(51) Int. Cl.
*H01M 10/6557* (2014.01)
*H01M 10/625* (2014.01)
*H01M 10/6563* (2014.01)

(56) References Cited

U.S. PATENT DOCUMENTS

2008/0247135 A1  10/2008  Inoue et al.
2009/0186266 A1* 7/2009  Nishino et al. ............... 429/120
2009/0197166 A1  8/2009  Horii et al.
2012/0070711 A1  3/2012  Souki et al.

FOREIGN PATENT DOCUMENTS

| JP | 2009-266413 A | 11/2009 |
| JP | 2012-069284 A | 4/2012 |

* cited by examiner

ELECTRIC STORAGE APPARATUS INCLUDING INTER-ELECTRIC STORAGE DEVICE AIR PASSAGES BETWEEN ELECTRIC STORAGE DEVICES AND AIR VENT PORTION FORMED AT END OF ELECTRIC STORAGE DEVICES

CROSS REFERENCE TO RELATED APPLICATIONS

The present application claims the priorities of Japanese Patent Application No. 2011-211501 and Japanese Patent Application No. 2012-194035 which is a domestic priority claiming application based on the same application, both of which are herein incorporated by reference.

FIELD OF THE INVENTION

The present invention relates to an electric storage apparatus including an electric storage device such as an electric cell (single cell) and a capacitor, and a holder for holding the electric storage device.

BACKGROUND ART

Conventionally, a cell module, which is one form of electric storage apparatus, is provided as the power source for equipment. The cell module includes a plurality of single cells which are electrically connected with each other, and a holder for holding the plurality of single cells.

The plurality of single cells are aligned in a first direction. Adjacent single cells are disposed with a predetermined space therebetween in the first direction. As a result of this, an inter-cell air passage which passes through in a second direction orthogonal to the first direction is formed between single cells.

There are various types of holders. As one of those types, for example, a holder including a holder body which is formed so as to be able to accommodate a plurality of single cells is provided (for example, see Japanese Patent Laid-Open No. 2009-181896).

The holder body includes one pair of column groups which are disposed on both sides in the first direction of the accommodated plurality of single cells. Each of the column groups is made up of a plurality of column portions which are opposed only to a single cell located at one end in the first direction. The plurality of column portions extend in a third direction orthogonal to the first and second directions and are spaced apart from each other in the second direction. As a result of this, air vent portions which are opened in the first direction are formed side by side in the second direction.

According to the cell module having the above described configuration, it is reported that by circulating gas in the inter-cell air passage and circulating gas through air vent portions, the plurality of single cells can be cooled thereby suppressing an excessive temperature rise of the single cells associated with charging and discharging.

However, the column portion opposed to the single cell located at one end in the first direction extends in the third direction orthogonal to the direction of gas circulation (the second direction). Therefore, the column portions impair smooth circulation of gas in the second direction. That is, the presence of the column portions necessarily increases the pressure loss of the gas circulating in the second direction in the air vent portions. Thus, in the cell module having the above described configuration, there may be a case that the single cell located at one end in the first direction is not effectively cooled.

Further, this type of problem similarly arises in, without being limited to single cells, electric storage devices such as capacitors.

SUMMARY OF THE INVENTION

Accordingly, it is an object of the present invention to provide an electric storage apparatus which can efficiently cool a plurality of electric storage devices, respectively.

An electric storage apparatus relating to the present invention includes:

a plurality of electric storage devices electrically connected with each other; and a holder for holding the plurality of electric storage devices, wherein the plurality of electric storage devices are aligned in a first direction, and are disposed to be spaced apart from an adjacent electric storage device with a predetermined space in the first direction to form an inter-electric storage device air passage passing through in a second direction orthogonal to the first direction between adjacent electric storage devices, the holder includes a holder body which can accommodate the plurality of electric storage devices, and the holder body includes at least one wall portion extending in the second direction, the at least one wall portion being opposed from outside to an electric storage device located at one end in the first direction among the plurality of electric storage devices, and an air vent portion formed side by side with the wall portion in a third direction orthogonal to the first and second directions, the air vent portion being opened to the first and second directions.

BRIEF DESCRIPTION OF THE DRAWINGS

FIG. 3 is an explanatory diagram of a single cell of the cell module relating to the same embodiment, in which

FIG. 5 is a perspective view of a holder body of the cell module relating to the same embodiment, in which

DETAILED DESCRIPTION OF THE PREFERRED EMBODIMENTS

Hereafter, a cell module relating to an embodiment of the present invention will be described with reference to the appended drawings.

Figure 1:
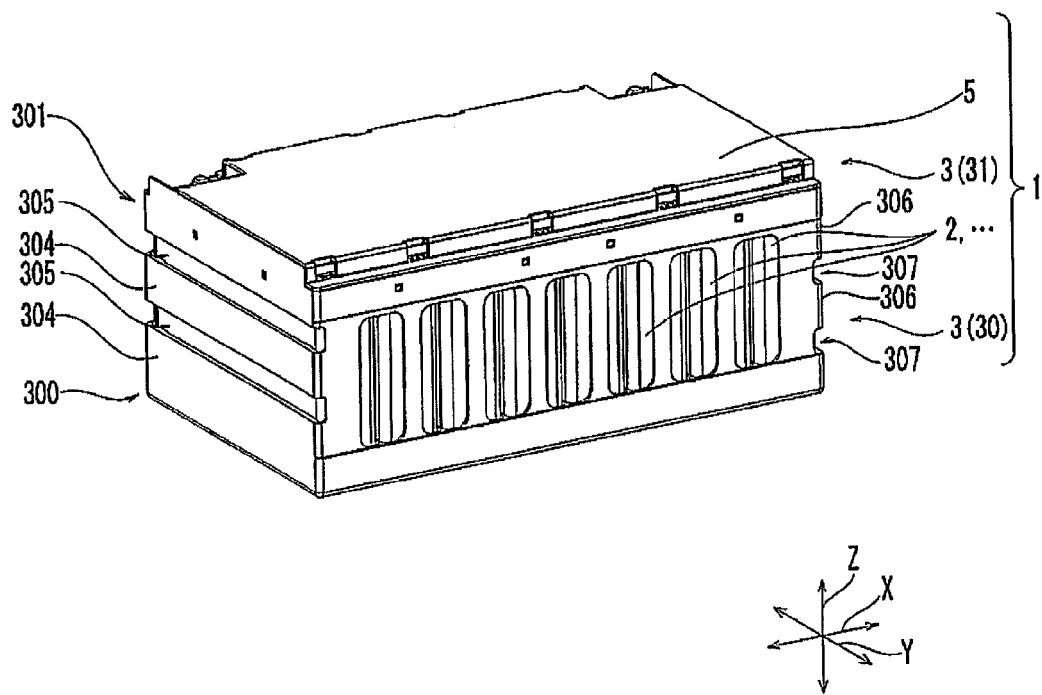
FIG. 1 is a general perspective view of a cell module relating to an embodiment of the present invention.
Figure 2:
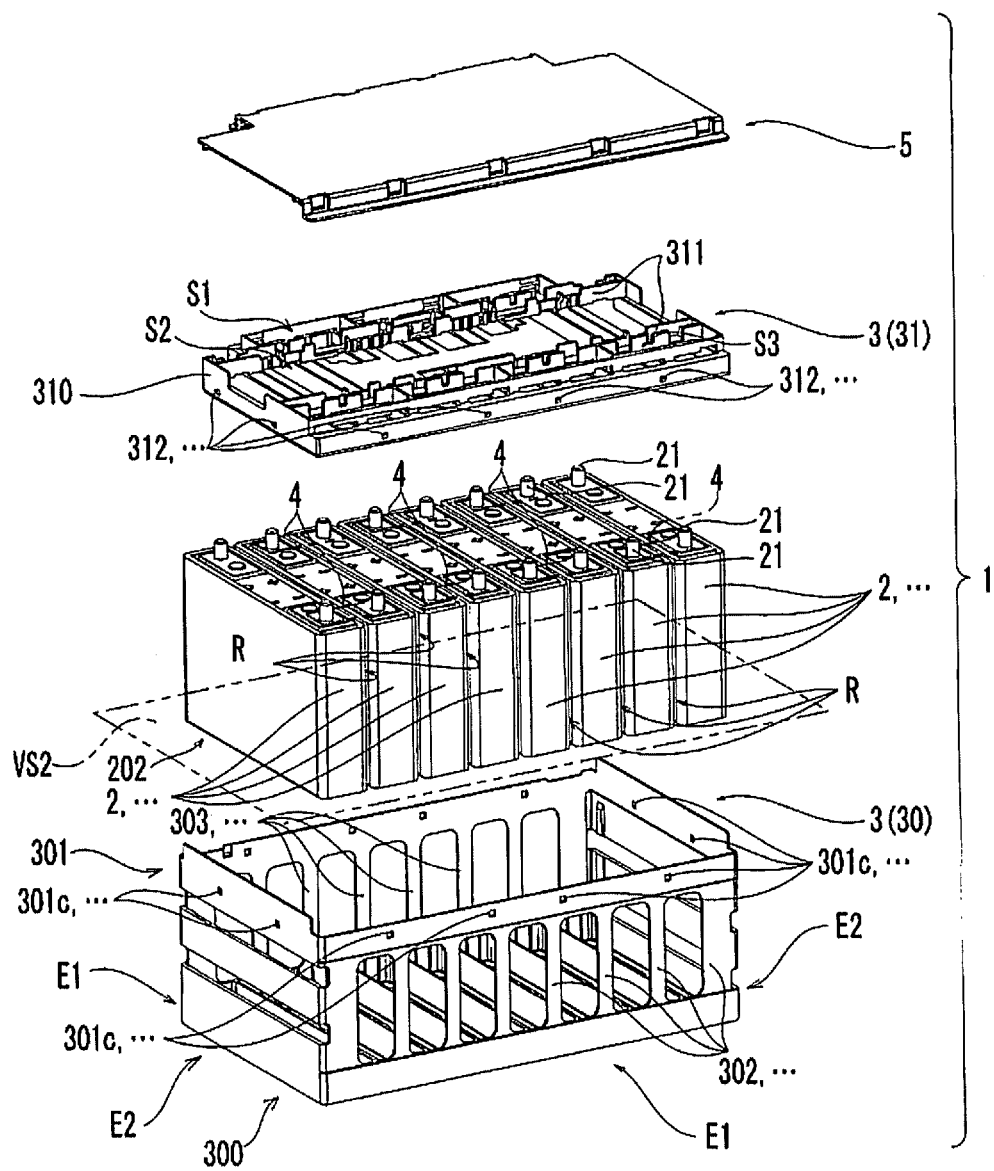
FIG. 2 is an exploded perspective view of the cell module relating to the same embodiment.
Figure 2:
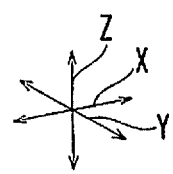

As shown in FIGS. 1 and 2, a cell module 1 includes a plurality of single cells 2, ..., and a holder 3 that holds the plurality of single cells 2, .... The cell module 1 further includes a bus bar 4 that electrically interconnects single cells 2, ..., and a cover 5 that covers the holder 3 holding the plurality of single cells 2, ....

Each of the plurality of single cells 2, ... can adopt a prismatic cell having a cuboid shape in appearance, a circular cell having a circular column shape in appearance, and the like. In the present embodiment, a prismatic cell is adopted for the single cell 2.

Figure 3A:
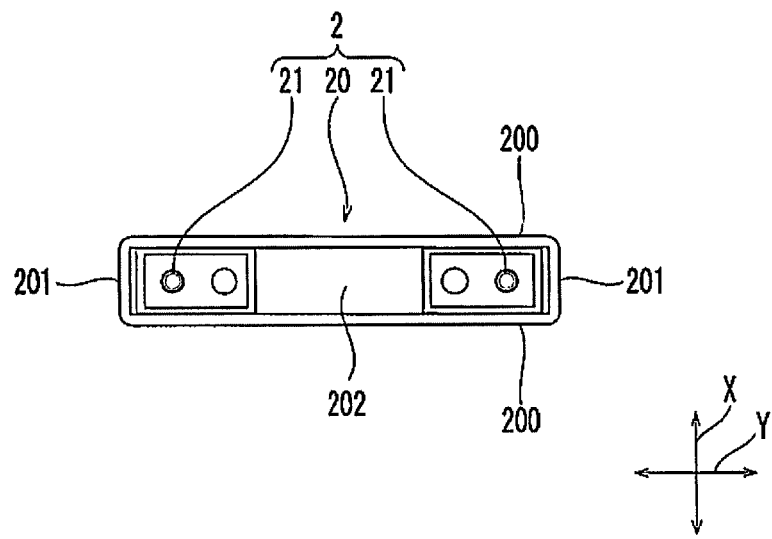
FIG. 3A is a plan view of the single cell.
Figure 3B:
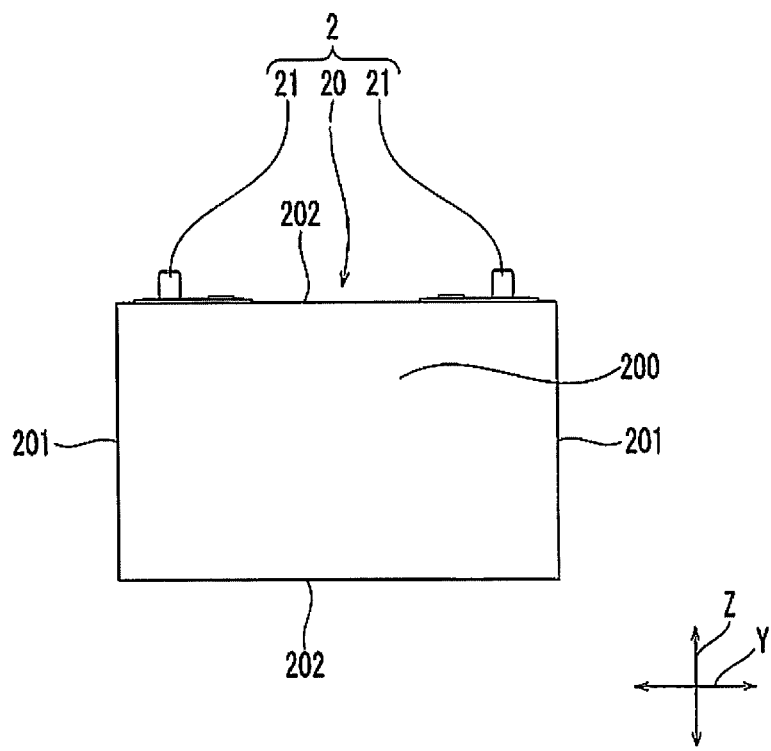
FIG. 3B is a front view of the single cell.

The single cell 2 includes, as shown in FIGS. 3A and 3B, a case 20, an electrode assembly (not shown) accommodated in the case 20, and one pair of external terminals 21, 21 disposed on the outer surface of the case 20, the external terminals each being electrically connected to the electrode assembly.

The case 20 is formed into a shape adapted to the type of single cell. In the present embodiment, as the single cell 2 is a prismatic cell as described above, the case 20 is formed into a cuboid shape in appearance. That is, the case 20 includes: one pair of first flat plate portions 200, 200 which are opposed to each other with a space therebetween in a first direction (the X direction of the orthogonal axes shown in FIG. 3A); one pair of second flat plate portions 201, 201 which are opposed to each other with a space therebetween in a second direction (the Y direction of the orthogonal axes shown in the figure) orthogonal to the first direction between the one pair of first flat plate portions 200, 200; and one pair of third flat plate portions 202, 202 which are opposed to each other with a space therebetween in a third direction (the Z direction of the orthogonal axes shown in FIG. 3B) orthogonal to each of the first and second directions between the one pair of first flat plate portions 200, 200 and between the one pair of second flat plate portions 201, 201. Note that in the description with reference to the drawings, for the sake of convenience, the first direction is referred to as an X direction, the second direction as a Y direction, and third direction as a Z direction.

The case 20 is flattened in the X direction. To be more specific, each of the one pair of first flat plate portions 200, 200 is formed into a rectangular shape which is longer in the Y direction. Each of the one pair of second flat plate portions 201, 201 is formed into a rectangular shape of which the length in the X direction is smaller than the length in the Y direction in the first flat plate portion 200, and which has a length in the Z direction. In association with this, each of the one pair of third flat plate portions 202, 202 is formed into a rectangular shape of which the length in the Y direction corresponds to the length in the Y direction of the first flat plate portion 200, and of which the length in the X direction corresponds to the length in the X direction of the second flat plate portion 201 and which has a length in the Y direction.

The electrode assembly includes a separator having electrical insulation, and a positive electrode plate and a negative electrode plate which are laid one on top of another with a separator interposed therebetween. One external terminal 21 is electrically connected to the positive electrode plate of the electrode assembly. In contrast to this, the other external terminal 21 is electrically connected to the negative electrode plate of the electrode assembly. Thus, the one external terminal 21 is referred to as a positive electrode terminal, and the other external terminal 21 as a negative electrode terminal.

The one pair of external terminals 21, 21 are disposed on the outer surface of one third flat plate portion 202. The third flat plate portion 202 has a length in the Y direction. In association with this, the one pair of external terminals 21, 21 are disposed to be spaced apart in the Y direction. Note that the external terminal 21 of the present invention adopts a bolt terminal which is screwed with a nut N when connecting an electrical load (see FIG. 2).

Figure 4:
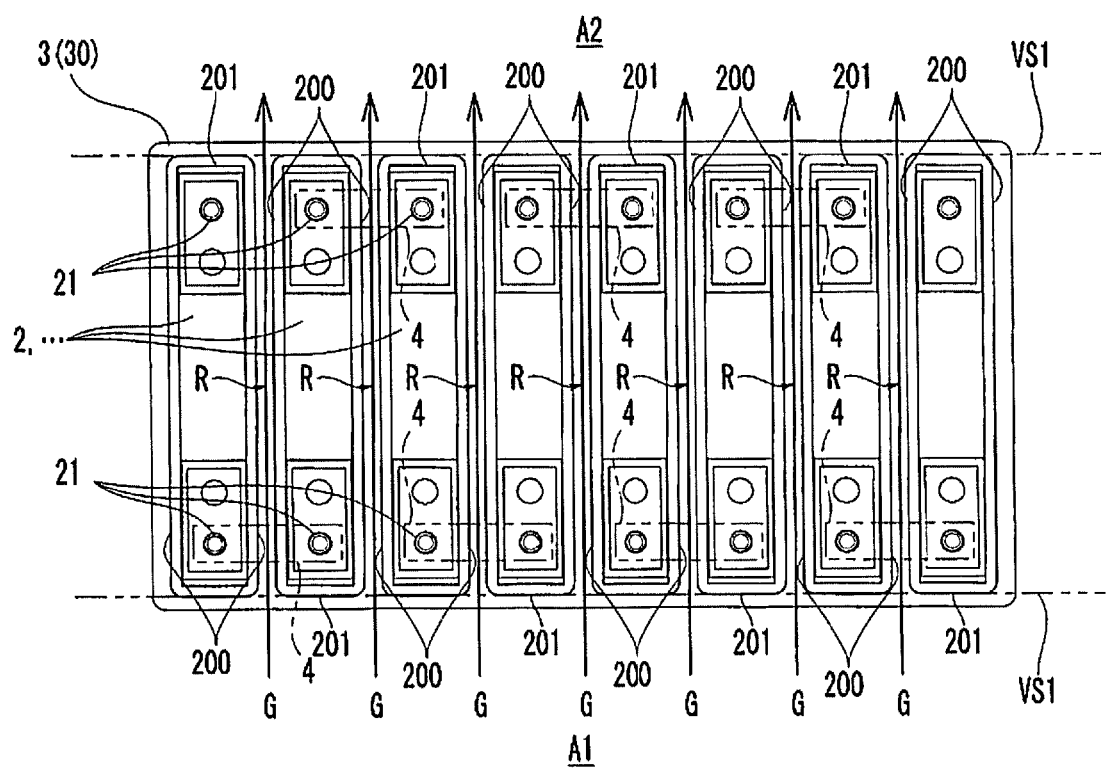
FIG. 4 is an explanatory diagram relating to the disposition of single cells and inter-cell air passages of the cell module relating to the same embodiment, which is a plan view with a module member and a cover being excluded.
Figure 4:
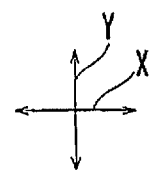

The plurality of single cells 2, are aligned in the X direction as shown in FIGS. 2 and 4. The plurality of single cells 2, ... are disposed to be aligned in the X direction such that each of the second flat plate portions 201, ... is located in a same virtual plane VS1 (see FIG. 4), and each of the third flat plate portions 202, ... is disposed in a same virtual plane VS2 (see FIG. 2).

In association with this, each of the plurality of single cells 2, ... is in a state that its one pair of first flat plate portions 200, 200 are respectively opposed to a first flat plate portion 200 of each of adjacent single cells 2, 2 as shown in FIG. 4. Moreover, each of the plurality of single cells 2, ... is disposed such that one pair of external terminals 21, 21 are positioned on one side (upper side) in the Z direction.

Adjacent single cells 2, 2 are disposed to be spaced apart with a predetermined space in the X direction. As a result of this, an air passage R penetrating in the Y direction (hereafter, referred to as an "inter-cell air passage") is formed between the single cells 2, 2. That is, as the result of that the plurality of single cells 2, ... are disposed to be spaced apart in the X direction, an inter-cell air passage R for circulating gas G for cooling between the first flat plate portions 200, 200 of adjacent single cells 2, 2 is formed.

Referring back to FIG. 2, the holder 3 includes a holder body 30 which can accommodate a plurality of single cells 2, .... The holder 3 further includes, in addition to the holder body 30, a hold member 31 which is disposed on the plurality of single cells 2, ... accommodated in the holder body 30.

Figure 5A:
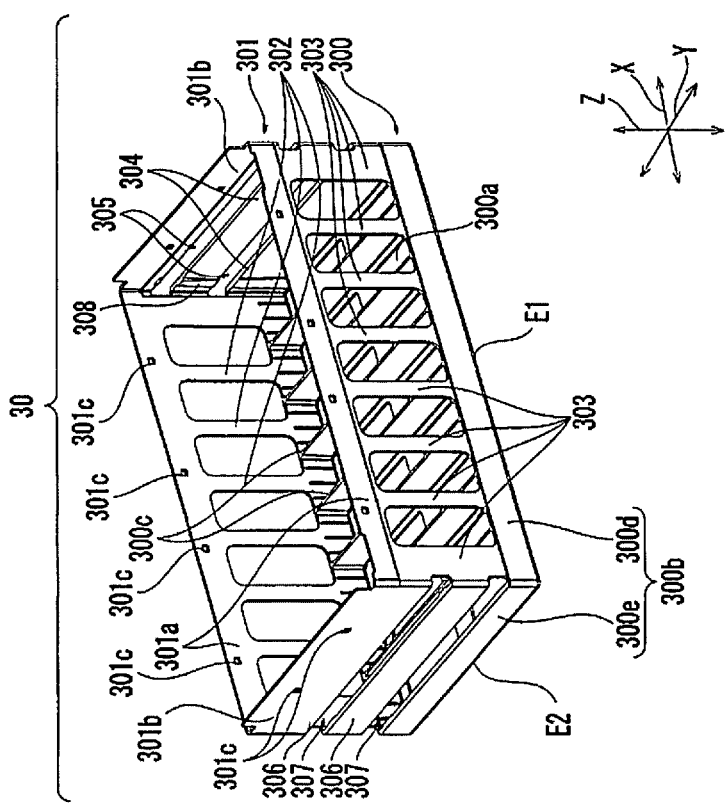
FIG. 5A is a perspective view of the holder body seen from one side in the X and Y directions.
Figure 5B:
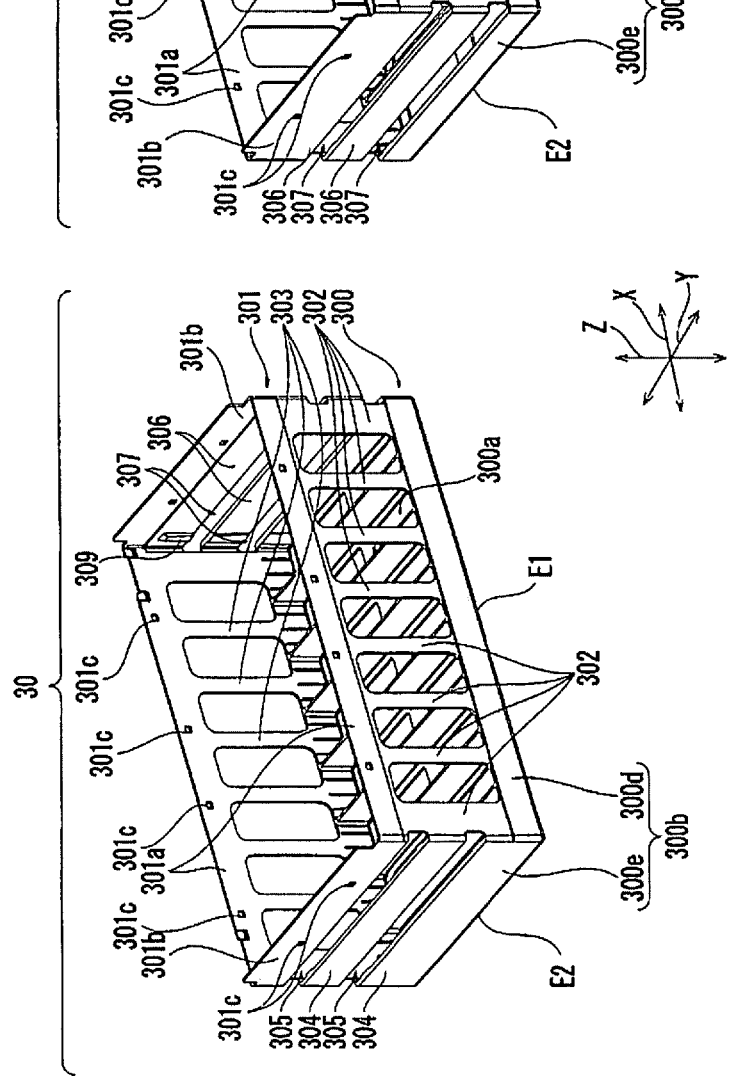
FIG. 5B is a perspective view of the holder body seen from the other side in the X and Y directions.

As shown in FIGS. 5A and 5B, the holder body 30 includes: wall portions 304, 306 extending in the second direction, the wall portions 304, 306 each being opposed from outside to a single cell 2 located at one end in the X direction; and air vent portions 305, 307 being opened to the X and Y directions, the air vent portions 305, 307 being formed side by side with the wall portions 304, 306 in the Z direction and along the wall portions 304, 306.

Describing more specifically, the holder body 30 includes: a bottom portion 300 formed to be able to carry a plurality of single cells 2, ...; a frame portion 301 formed to be able to collectively enclose the upper parts of the plurality of single cells 2, ... carried on the bottom portion 300; and column portions 302, 303 which are disposed not to be opposed to the inter-cell air passage R. The holder body 30 includes: at least one wall portion (hereafter referred to as a "first wall portion") 304 extending in the Y direction, the first wall portion 304 being opposed from outside to one single cell 2 located at one end in the X direction; an air vent portion (hereafter, referred to as a "first air vent portion") 305 being opened to the X and Y directions, the first air vent portion 305 being formed to be side by side with the first wall portion 304 in the Z direction and along the first wall portion 304; at least one wall portion (hereafter, referred to as a "second wall portion") 306 extending in the Y direction, the second wall portion 306 being opposed from outside to the other second single cell 2 located at one end in the X direction; and an air vent portion (hereafter referred to as a "second air vent portion") 307 opened to the X and Y directions, the second air vent portion 307 being formed side by side with the second wall portion 306 in the Z direction and along the second wall portion 306.

The bottom portion 300 includes one pair of first edge portions E1, E1, each of which extends in the X direction, are placed side by side with a space therebetween in the Y direction; and one pair of second edge portions E2, E2, each of which extends in the Y direction, are placed side by side with a spacing therebetween in the X direction between the one pair of first edge portions E1, E1. The bottom portion 300 is configured to be able to carry the aligned plurality of single cells 2, . . . .

Describing more specifically, the bottom portion 300 includes: a bottom body 300a of which plan shape and plan size are specified to correspond to a planar region occupied by the whole of the aligned plurality of single cells 2, . . . ; and a bottom frame portion 300b which rises from all around the outer peripheral edge of the bottom body 300a and collectively encloses the lower parts of the plurality of single cells 2, . . . carried on the bottom body 300a.

In the present embodiment, the single cell 2 adopts a prismatic cell as described above, and a plurality of single cells 2, . . . are disposed in alignment in the X direction. That is, the planar region occupied by the whole of the plurality of single cells 2, . . . is of a rectangular shape. In association with this, the bottom body 300a is formed to have a contour of a substantially rectangular shape. The contour of the bottom body 300a corresponds to the contour of the entire bottom portion 300. Further, the bottom portion 300 includes a plurality of spacers 300c, . . . disposed on the bottom body 300a. Each of the plurality of spacers 300c, . . . is formed into a strip shape which has a length in the Y direction. The thickness of the spacer 300c in the X direction corresponds to the size in the X direction of each of the inter-cell air passages R. The plurality of spacers 300c, . . . are disposed to be spaced apart in the X direction with a space corresponding to the size in the X direction of the single cell 2.

The bottom frame portion 300b is provided along the contour of the bottom body 300a. That is, the bottom frame portion 300b includes: one pair of first raised portions 300d, 300d extending in the X direction and placed side by side with a space therebetween in the Y direction, the one pair of first raised portions 300d, 300d each having a first end portion in the X direction and a second end portion at the opposite side of the first end portion, and each having a third end portion in the Z direction and a fourth end portion at the opposite side of the third end portion; one pair of second raised portions 300e, 300e placed side by side with a space therebetween in the X direction between the one pair of the first raised portions 300d, 300d, the one pair of second raised portions 300e, 300e each having a first end portion in the Y direction and a second end portion at the opposite side of the first end portion, and each having a third end portion in the Z direction and a fourth end portion at the opposite side of the third end portion.

Each of the one pair of first raised portions 300d, 300d extends straight in the X direction. Each of the one pair of second raised portions 300e, 300e extends straight in the Y direction. The first end portion of one first raised portion 300d is connected to the first end portion of one second raised portion 300e. The second end portion of one first raised portion 300d is connected to the first end portion of the other second raised portion 300e. The first end portion of the other first raised portion 300d is connected to the second end portion of one second raised portion 300e. The second end portion of the other first raised portion 300d is connected to the second end portion of the other second raised portion 300e.

Each third end portion of the one pair of first raised portions 300d, 300d, and each third end portion of the one pair of second raised portions 300e, 300e are connected to the bottom body 300a.

As a result of this, the one pair of first raised portions 300d, 300d make up one pair of first edge portions E1, E1 in the entire bottom portion 300, and one pair of second raised portions 300e, 300e make up one pair of second edge portions E2, E2 in the entire bottom portion 300.

The frame portion 301 includes: one pair of frame plate portions (hereafter, referred to as "first frame plate portions") 301a, 301a each disposed corresponding to each of the one pair of first edge portions E1, E1 in the bottom portion 300; and one pair of frame plate portions (hereafter, referred to as "second frame plate portions") 301b, 301b each disposed corresponding to each of the one pair of second edge portions E2, E2. The frame portion 301 is configured to be able to be enclosed by the one pair of the first frame plate portions 301a. 301a and the one pair of second frame plate portions 301b, 301b.

Each of the one pair of first frame plate portions 301a, 301a extends straight in the X direction. In association with this, each of the one pair of first frame plate portions 301a, 301a has a first end portion in the X direction and a second end portion at the opposite side of the first end portion, and has a third end portion in the Z direction and a fourth end portion at the opposite side of the third end portion. Each of the one pair of second frame plate portions 301b, 301b extends straight in the Y direction. In association with this, each of the one pair of second frame plate portions 301b, 301b has a first end portion in the Y direction and a second end portion at the opposite side of the first end portion, and has a third end portion in the Z direction and a fourth end portion at the opposite side of the third end portion.

The first end portion of one first frame plate portion 301a is connected to the first end portion of one second frame plate portion 301b. The second end portion of one first frame plate portion 301a is connected to the first end portion of the other second frame plate portion 301b. The first end portion of the other first frame plate portion 301a is connected to the second end portion of one second frame plate portion 301b. The second end portion of the other first frame plate portion 301a is connected to the second end portion of the other second frame plate portion 301b.

A plurality of engagement holes 301c, . . . are provided to be spaced apart in the circumferential direction in the frame portion 301. That is, two or more engagement holes 301c, . . . are provided to be spaced apart in the lengthwise direction in each of the one pair of first frame plate portions 301a, 301a and the one pair of second frame plate portions 301b, 301b. Note that although the engagement holes 301c, . . . may be through holes or non-through holes provided that they are opened to the inside, the present embodiment is made up of a through hole.

Each of the column portions 302, 302 has a first end portion in the Z direction and a second end portion at the opposite side of the first end portion. The first end portion is connected to the first edge portion E1 in the bottom portion 300, and the second end portion is connected to the first frame plate portion 301a in the frame portion 301 corresponding to the first edge portion E1 to which the first end portion is connected. That is, each of the column portions 302, 302 extends in the Z direction between the bottom portion 300 and the frame portion 301. In the present embodiment, a plurality of column portions 302, . . . and a plurality of column portions 303, . . . are provided. The plurality of column portions 302, . . . and the plurality of column portions 303, ... are disposed to be spaced apart from each other in the X direction.

Describing more specifically, the holder body 30 includes; a plurality of first column portions 302, ... which connect one first edge portion E1 in the bottom portion 300 to one first frame plate portion 301a corresponding to the one first edge portion E1; and a plurality of second column portions 303, ... which connect the other first edge portion E1 in the bottom portion 300 to the other first frame plate portion 301a corresponding to the other first edge portion E1.

Each of the plurality of first column portions 302, ... has a first end portion in the Z direction and a second end portion at the opposite side of the first end portion. Each of the plurality of first column portions 302, ... is set to have a length in the X direction less than the length in the X direction of the second flat plate portion 201 of the single cell 2, and is formed into a strip shape having a length in the Z direction.

Each of the plurality of first column portions 302, ... is disposed not to be opposed to the inter-cell air passage R so as to deviate from the inter-cell air passage R. That is, each of the plurality of first column portions 302, ... is disposed so as to correspond to each of the plurality of single cells 2, .... The plurality of first column portions 302, ... are opposed only to the second flat plate portion 201 of corresponding single cell 2 so as not to impair the inflow or outflow of the air for corresponding inter-cell air passage R. As a result of this, each of the plurality of first column portions 302, ... is in a state of being formed with an opening opposed to the inter-cell air passage R between itself and an adjacent first column portions 302.

The first end portion of each of the plurality of first column portions 302, ... is connected to the fourth end portion of one first raised portion 300d in the bottom frame portion 300b. The second end portion of each of the plurality of first column portions 302, ... is connected to the third end portion of one first frame plate portion 301a in the frame portion 301.

Each of the plurality of second column portions 303, ... has a first end portion in the Z direction and a second end portion at the opposite side of the first end portion. Each of the plurality of second column portions 303, ... is set to have a length in the X direction less than the length in the X direction of the second flat plate portion 201 of the single cell 2, and is formed into a strip shape having a length in the Z direction.

Each of the plurality of second column portions 303, ... is disposed not to be opposed to the inter-cell air passage R to avoid the inter-cell air passage R. That is, each of the plurality of second column portions 303, ... is disposed so as to correspond to each of the plurality of single cells 2, .... The plurality of second column portions 303, ... are opposed only to the second flat plate portion 201 of corresponding single cell 2 so as not impair the inflow or outflow of air for corresponding inter-cell air passage R. As a result of this, each of the plurality of second column portions 303, ... is in a state of being formed with an opening opposed to the inter-cell air passage R between itself and an adjacent second column portion 303. Note that each of the plurality of first column portions 302, ... stands facing each of the plurality of second column portions 303, ... with corresponding single cell 2 interposed therebetween.

The first end portion of each of the plurality of second column portions 303, ... is connected to the fourth end portion of the other first raised portion 300d in the bottom frame portion 300b. The second end portion of each of the plurality of second column portions 303, ... is connected to the third end portion of the other first frame plate portion 301a in the frame portion 301.

The first wall portion 304 is disposed between one second frame plate portion 301b and one second edge portion E2. Describing more specifically, the first wall portion 304 has a first end portion in the Y direction, and a second end portion at the opposite side of the first end portion. The first wall portion 304 is formed into a strip shape having a length in the Y direction. There are provided a plurality (two in the present embodiment) of the first wall portions 304, .... The plurality of first wall portions 304, ... are disposed to be spaced apart with a predetermined space in the Z direction between the bottom portion 300 and the frame portion 301. In the present embodiment, one first wall portion 304 is disposed to be spaced apart with a predetermined space from the second frame plate portion 301b of the frame portion 301 in the Z direction. The other first wall portion 304 is integrally formed with the second raised portion 300e of the bottom portion 300. In the present embodiment, the space between one first wall portion 304 and the second frame plate portion 301b of the frame portion 301 is set to be the same as the space between the two first wall portions 304, 304.

Note that in relation to the space between the bottom portion 300 and the frame portion 301, and the space among the plurality of first wall portions 304, ... , the two first wall portions 304, 304 have respectively different lengths in the Y direction. However, when a plurality of the first wall portions 304, ... are disposed, taking consideration of the relations with the number of the first wall portions 304, ... , the space between the bottom portion 300 and the frame portion 301, and the space among the plurality of first wall portions 304, ... , the length in the Z direction of each of the plurality of first wall portions 304, ... may be made uniform.

Each of the first column portion 302 and the second column portion 303, which are disposed at one side in the X direction, is linked to the first end portion of each of the one pair of first raised portions 300d, 300d. In association with this, the first end portion of each of the plurality of first wall portions 304, ... is directly connected to the first column portion 302 disposed at one side in the X direction; and the second end portion of each of the plurality of first wall portions 304, ... is directly connected to the second column portion 303 disposed at one side in the X direction. As a result of this, each of the plurality of first wall portions 304, ... is fixed in a state of being opposed to one single cell 2, ... located at the outermost side in the X direction.

Here, the plurality of first wall portions 304, ... have a thickness gradually decreasing from the bottom portion 300 toward the frame portion 301. Accordingly, the distance between the inner surface of the plurality of first wall portions 304, ... and the side surface of the single cell 2 (the first flat plate portion 200 of the case 20) located at one end in the X direction gradually increases as advancing from the bottom portion 300 toward the frame portion 301. That is, the plurality of first wall portions 304, ... have an inclined inner surface which gradually separates away from the side surface of the single cell 2 as they advance from the bottom portion 300 toward the frame portion 301. With this surface configuration of the plurality of first wall portions 304, ..., when the single cell 2 located at one end in the X direction is to be inserted into the holder body 30, such insertion can be easily made. Also, gas, which has been heated as a result of the cooling of the single cell 2 located at one end in the X direction, can easily escape to the upper side.

Each of the plurality of first wall portions 304, ... has a rib 308 on its inner surface. Each rib 308 is formed along the Z direction, and a plurality of ribs 308, ... are aligned in the Z direction. Describing more specifically, each rib 308 is formed on each first wall portion 304 from an upper edge to a lower edge thereof in the Z direction and a plurality of ribs 308, . . . are aligned in the Z direction. Thus, a plurality of ribs 308, . . . make up a single elongated rib extending in the Z direction separated by the first air vent portions 305. Such a single elongated rib extending in the Z direction is provided at each of two lateral sides of the first and second end portions in the Y direction of the plurality of first wall portions 304, . . . (only a left one is shown in FIG. 5B) in the present embodiment. Each rib 308 is positioned in parallel with and held in contact with the side surface of the single cell 2 located at one end in the X direction, thereby preventing the single cell 2 from moving in the X direction.

The first air vent portion 305 is opened in the X direction as well as in the Y direction. Describing more specifically, the first air vent portion 305 is made up of a space which is a non-forming region of the first wall portion 304 formed along the first wall portion 304. The size of the first air vent portion 305 in the Z direction is uniformly set over the total length in the Y direction. As the plurality of first wall portions 304, . . . are disposed to be spaced apart in the Z direction, the first air vent portion 305 is formed at multiple locations to be spaced apart in the Z direction. In the present embodiment, two of the first wall portions 304, 304 are disposed to be spaced apart from each other in the Z direction. In association with this, the first air vent portion 305 is formed between the second frame plate portion 301b of the frame portion 301 and one first wall portion 304, which are adjacent to each other in the Z direction, and between two first wall portions 304, 304 which are adjacent to each other in the Z direction. Further, as described above, the space between one first wall portion 304 and the frame portion 301 is set to be the same as that between two first wall portions 304, 304 so that the respective sizes in the Z direction of the two first air vent portions 305, 305 are configured to be same.

The sizes in the X and Z directions of the first air vent portion 305 are set such that the cross-sectional area (the area of the entire region in which gas circulates) seen from the Y direction of an air passage (a first inter-module air passage to be described below) R1 which is formed by the first air vent portion 305 (see FIGS. 7 and 8), more specifically the cross-sectional area of the first inter-module air passage R1 when the holder body 30 is seen from outside in the Y direction, is the same or substantially same as the cross-sectional area seen from the Y direction of each inter-cell air passage R. In the present embodiment, the first air vent portions 305, 305 are formed at two locations. For that purpose, the size of each of the two first air vent portions 305, 305 is set such that the total of the cross-sectional areas of the first inter-module air passages R1, R1 formed respectively by the first air vent portions 305, 305 at the two locations is the same or substantially the same as the cross-sectional area of each of the inter-cell air passages R.

The second wall portion 306 is disposed between the other second frame plate portion 301b and the other second edge portion E2. Describing more specifically, the second wall portion 306 has a first end portion in the Y direction and a second end portion at the opposite side of the first end portion. The second wall portion 306 is formed into a strip shape having a length in the Y direction. There are provided a plurality (two in the present embodiment) of the second wall portions 306, . . . . The plurality of second wall portions 306, . . . are disposed to be spaced apart with a predetermined space in the Z direction between the bottom portion 300 and the frame portion 301. In the present embodiment, one second wall portion 306 is integrally formed with the second frame plate portion 301b of the frame portion 301. The other second wall portion 306 is disposed to be spaced apart from the second raised portion 300e of the bottom portion 300. In the present embodiment, the space between the other second wall portion 306 and the second raised portion 300e of the bottom portion 300 is set to be the same as the space between the two second wall portions 306, 306.

Note that, because of the relation between the space between the bottom portion 300 and the frame portion 301, and the space among the plurality of second wall portions 306, . . . , the respective lengths in the Y direction of the two second wall portions 306, 306 are different. However, when a plurality of second wall portions 306, . . . are provided, taking consideration of the relations with the number of the second wall portions 306, . . . , the space between the bottom portion 300 and the frame portion 301, and the space among the plurality of second wall portions 306, . . . , the length in the Z direction of each of the plurality of second wall portions 306, . . . may be made uniform.

Each of the first column portion 302 and the second column portion 303, which are disposed at the other side in the X direction, is linked to the second end portion of each of the one pair of first raised portions 300d, 300d. In association with this, the first end portion of each of the plurality of second wall portions 306, . . . is directly connected to the first column portion 302 disposed at one side in the X direction, and the second end portion of each of the plurality of second wall portions 306, . . . is directly connected to the second column portion 303 disposed at one side in the X direction. As a result of this, each of the plurality of second wall portions 306, . . . is fixed in a state of being opposed to the other single cell 2 which is located at the outermost side in the X direction.

Here, the plurality of second wall portions 306, . . . have a thickness gradually decreasing from the bottom portion 300 toward the frame portion 301. Accordingly, the distance between the inner surface of the plurality of second wall portions 306, . . . and the side surface of the single cell 2 (the first flat plate portion 200 of the case 20) located at one end in the X direction gradually increases as advancing from the bottom portion 300 toward the frame portion 301. That is, the plurality of second wall portions 306, . . . have an inclined inner surface which gradually separates away from the side surface of the single cell 2 as they advance from the bottom portion 300 toward the frame portion 301. With this surface configuration of the plurality of second wall portions 306, . . . , the single cell 2 located at one end in the X direction can be easily inserted into the holder body 30. Also, gas, which has been heated as a result of the cooling of the single cell 2 located at one end in the X direction, can easily escape to the upper side.

Each of the plurality of second wall portions 306, . . . has a rib 309 on its inner surface. Each rib 309 is formed along the Z direction, and a plurality of ribs 309, . . . are aligned in the Z direction. Describing more specifically, each rib 309 is formed on each second wall portion 306 from an upper edge to a lower edge thereof in the Z direction and a plurality of ribs 309, . . . are aligned in the Z direction. Thus, a plurality of ribs 309, . . . make up a single elongated rib extending in the Z direction separated by the second air vent portions 307. Such a single elongated rib extending in the Z direction is provided at each of two lateral sides of the first and second end portions in the Y direction of the plurality of second wall portions 306, . . . (only a left one is shown in FIG. 5A) in the present embodiment. Each rib 309 is positioned in parallel with and held in contact with the side surface of the single cell 2 located at one end in the X direction, thereby preventing the single cell 2 from moving in the X direction.

The second air vent portion 307 is opened in the X direction as well as in the Y direction. Describing more specifically, the second air vent portion 307 is made up of a space which is a non-forming region of the second wall portion 306 formed along the second wall portion 306. The size of the second air vent portion 307 in the Z direction is uniformly set over the total length in the Y direction. As the plurality of second wall portions 306, . . . are disposed to be spaced apart in the Z direction, the second air vent portion 307 is formed at multiple locations to be spaced apart in the Z direction. In the present embodiment, two of the second wall portions 306, 306 are spaced apart from each other in the Z direction. In association with this, the second air vent portion 307 is formed between the two second wall portions 306, 306 which are adjacent to each other in the Z direction, and between the other second wall portion 306 and the second raised portion 300e of the bottom portion 300. Further, as described above, the space between the other second wall portion 306 and the second raised portion 300e of the bottom portion 300 is set to be the same as that between two second wall portions 306, 306 so that the respective sizes in the Z direction of the two second air vent portions 307, 307 are configured to be same.

The sizes in the X and Z directions of the second air vent portion 307 are set such that the cross-sectional area (the area of the entire region in which gas circulates) seen from the Y direction of an air passage (a second inter-module air passage to be described below) R2 which is formed by the second air vent portion 307 (see FIGS. 7 and 8), more specifically the cross-sectional area of the second inter-module air passage R2 when the holder body 30 is seen from outside in the Y direction, is the same or substantially the same as the cross-sectional area (the area of the entire region in which gas circulates) seen from the Y direction of the first inter-module air passage R1 (see FIGS. 7 and 8) formed by the first air vent portion 305.

In the present embodiment, as described above, the sizes in the X and Z directions of the first air vent portion 305 are set such that the cross-sectional area of the first inter-module air passage R1 (see FIGS. 7 and 8) is the same or substantially the same as the cross-sectional area of each of the inter-cell air passages R. Therefore, in the present embodiment, the sizes in the X and Z directions of the second air vent portion 307 are set such that the cross-sectional area of the second inter-module air passage R2 (see FIGS. 7 and 8) is also the same or substantially the same as the cross-sectional area as seen from the Y direction of each of the inter-cell air passages R. In the present embodiment, the second air vent portions 307, 307 are formed at two locations. For that purpose, the size of each of the two second air vent portions 307, 307 is set such that the total of the cross-sectional areas of the second inter-module air passages R2, R2 formed respectively by the second air vent portions 307, 307 at the two locations is the same or substantially the same as the cross-sectional area of each of the inter-cell air passages R.

Thus, as the result of that the first wall portions 304, . . . , the first air vent portions 305, . . . , the second wall portions 306, . . . , and the second air vent portion 307 are disposed as described above, the first wall portions 304, . . . and the second wall portions 306, . . . are disposed to be relatively deviated in position from each other in the Z direction in the present embodiment.

As a result of this, the disposition of the first air vent portion 305 corresponds to the disposition of the second wall portion 306, and the disposition of the second air vent portion 307 corresponds to the disposition of the first wall portion 304, in the Z direction. That is, when two or more cell modules 1 having a common configuration are aligned in the X direction, the first air vent portion 305 and the second wall portion 306 of adjacent cell modules 1, 1 overlap one another in the X direction, and the second air vent portion 307 and the first wall portion 304 of adjacent cell modules 1, 1 also overlap one another in the X direction.

Figure 6:
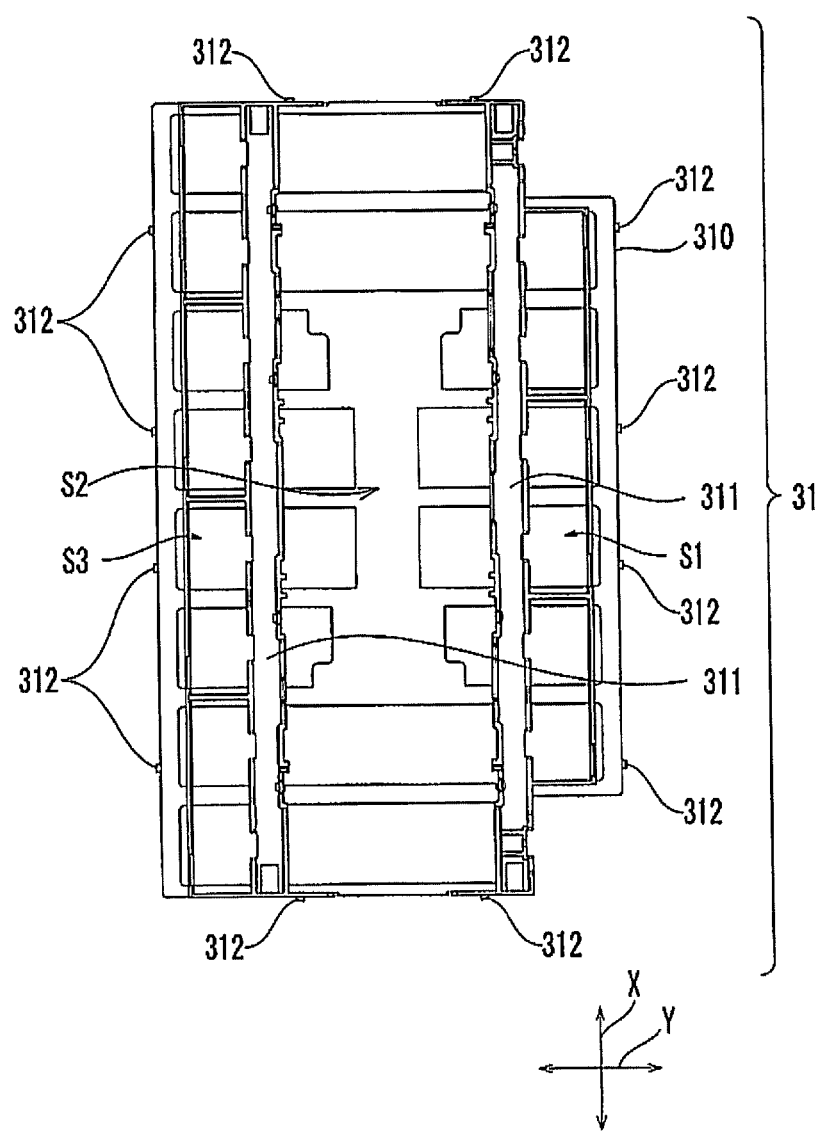
FIG. 6 is a plan view of a hold member of a cell module relating to the same embodiment.

A hold member 31 includes an outer frame portion 310 which can be fit into the frame portion 301 as shown in FIG. 6, and a beam portion 311 constructed in the outer frame portion 310. The outer frame portion 310 is formed so as to surround all the external terminals 21, . . . of the plurality of single cells 2, . . . in a state that one external terminal (positive electrode terminal) 21 of one single cell 2 of two single cells 2, 2 which are located at outermost sides in the X direction among the plurality of single cells 2, . . . disposed on the bottom portion 300 of the holder body 30, and the other external terminal (negative electrode terminal) 21 of the other single cell 2 are excluded. That is, the outer frame portion 310 is formed such that only the positive electrode terminal 21 and the negative electrode terminal 21, which serve as the terminal for the external output of the cell module 1, can be exposed to the outside. An engagement projection 312, which is engageable with the engagement hole 301c provided in the frame portion 301 of the holder body 30, is provided in the outer periphery of the outer frame portion 310. There are provided a plurality of the engagement projections 312, . . . corresponding to the disposition of the engagement holes. As a result of this, each of the plurality of engagement projections 312, . . . engages with each of the plurality of engagement holes with the outer frame portion 310 being fitted into the frame portion 301 so that the hold member 31 is linked with the holder body 30.

The beam portion 311, which has a length in the X direction, has a first end portion in the X direction, and a second end portion at the opposite side of the first end portion. The hold member 31 includes a plurality of beam portions 311, 311. The plurality of beam portions 311, 311 are disposed to be spaced apart from each other in the Y direction. Two beam portions 311, 311 are provided and are disposed to be spaced apart in the Y direction in the outer frame portion 310. The first end portion and second end portion of each of the two beam portions 311, 311 are connected to the outer frame portion 310. As a result of this, the region, which is surrounded by the outer frame portion 310, is sectioned into three regions S1, S2, S3 in the Y direction by the two beam portions 311, 311. Further, the plurality of beam portions 311, 311 are interlinked, and also a mid-portion in the X direction of the beam portion 311 and the outer frame portion 310 are conveniently interlinked, so that the strength of the entire hold member 31 is increased.

The hold member 31 is configured such that in a state that the outer frame portion 310 is fitted into the frame portion 301, a plurality of external terminals 21, . . . which are aligned in the X direction on one side in the Y direction, are disposed in a region S1 on one side in the Y direction; and a plurality of external terminals 21, . . . which are aligned in the X direction on the other side in the Y direction are disposed in a region S3 on the other side in the Y direction.

The hold member 31 is configured such that in a state of being interlinked with the frame portion 301 of the holder body 30, the beam portions 311, . . . are disposed on one third flat plate portion 202 of the plurality of single cells 2, . . . carried on the bottom portion 300.

Referring back to FIG. 2, the bus bar 4, which is made up of a metal plate, electrically connects the positive electrode terminal 21 and the negative electrode terminal 21 of adjacent single cells 2, 2. The cover 5 is formed so as to be able to cover a substantially entire range of the region surrounded by the outer frame portion 310 of the hold member 31. That is, the cover 5 is configured to be able to generally or entirely cover the external terminal 21 and the bus bar 4 of the single cell 2 to be exposed in the region surrounded by the outer frame portion 310 of the hold member 31. The cover 5 is configured to be linkable to the outer frame portion 310 of the hold member 31 in a state of covering a substantially entire range of the region surrounded by the outer frame portion 310.

The cell module 1 relating to the present embodiment is as so far described. Next, the effects and advantages of the cell module 1 of the above described configuration will be described.

Disposing a plurality of single cells 2, . . . on the bottom portion 300 of the holder body 30 will result in a state that the frame portion 301, a plurality of first column portions 302, . . . , a plurality of second column portions 303, . . . , a plurality of first wall portions 304, . . . , and a plurality of second wall portions 306, . . . surround the plurality of single cells 2, . . . all together. This leads to a state that the movement of the plurality of single cells 2, . . . in the X and Y directions is restricted, and the plurality of single cells 2, . . . are maintained to be spaced away from each other with a predetermined space and aligned in the X direction.

Moreover, linking the hold member 31 to the holder body 30 will result in that the hold member 31 is disposed over the plurality of single cells 2, . . . carried on the bottom portion 300. As a result of this, the plurality of single cells 2, . . . will be prevented from moving in the Z direction, in addition to moving in the X and Y directions.

Therefore, even if the cell module 1 is adopted as the power source for equipment in which vibration occurs, the plurality of single cells 2, . . . can be securely held in an appropriate disposition in which an inter-cell air passage R is formed.

Further, an electrical load is connected to the external terminals 21, 21 for external output. Furthermore, the cell module 1 is accommodated in a packaging case (not shown) which includes an air blower for cooling. The packaging case includes one pair of air passages A1, A2 (see FIG. 4) disposed on both sides in the Y direction of the accommodated cell module 1. One air passage A1 is held in gas communication with the air blower, and the other air passage A2 is connected to an exhaust port. As a result of this, gas supplied to the one air passage A1 flows into the other air passage A2 via the region where the cell module 1 is disposed, and is discharged from the exhaust port.

Based on this, as shown in FIG. 4, gas from the one air passage A1 flows into each of the inter-cell air passages R, and the gas flown into the inter-cell air passage R is discharged to the other air passage A2 so that each of the plurality of single cells 2, . . . is cooled by the gas that circulates in each of the plurality of inter-cell air passages R, . . . . This will suppress the temperature rise of the plurality of single cells 2, . . . associated with charging and discharging. In the present embodiment, the inner-cell air passages R are formed between the first flat plate portions 200, 200 which have the largest area among the flat plate portions 200, 201, 203 making up the outer surface of the case 20 of the single cells 2, . . . . Therefore, the contact area between the gas that circulates in the inter-cell air passages R and the case 20 becomes large so that effective cooling, that is, the suppression of temperature rise becomes possible.

Figure 7:
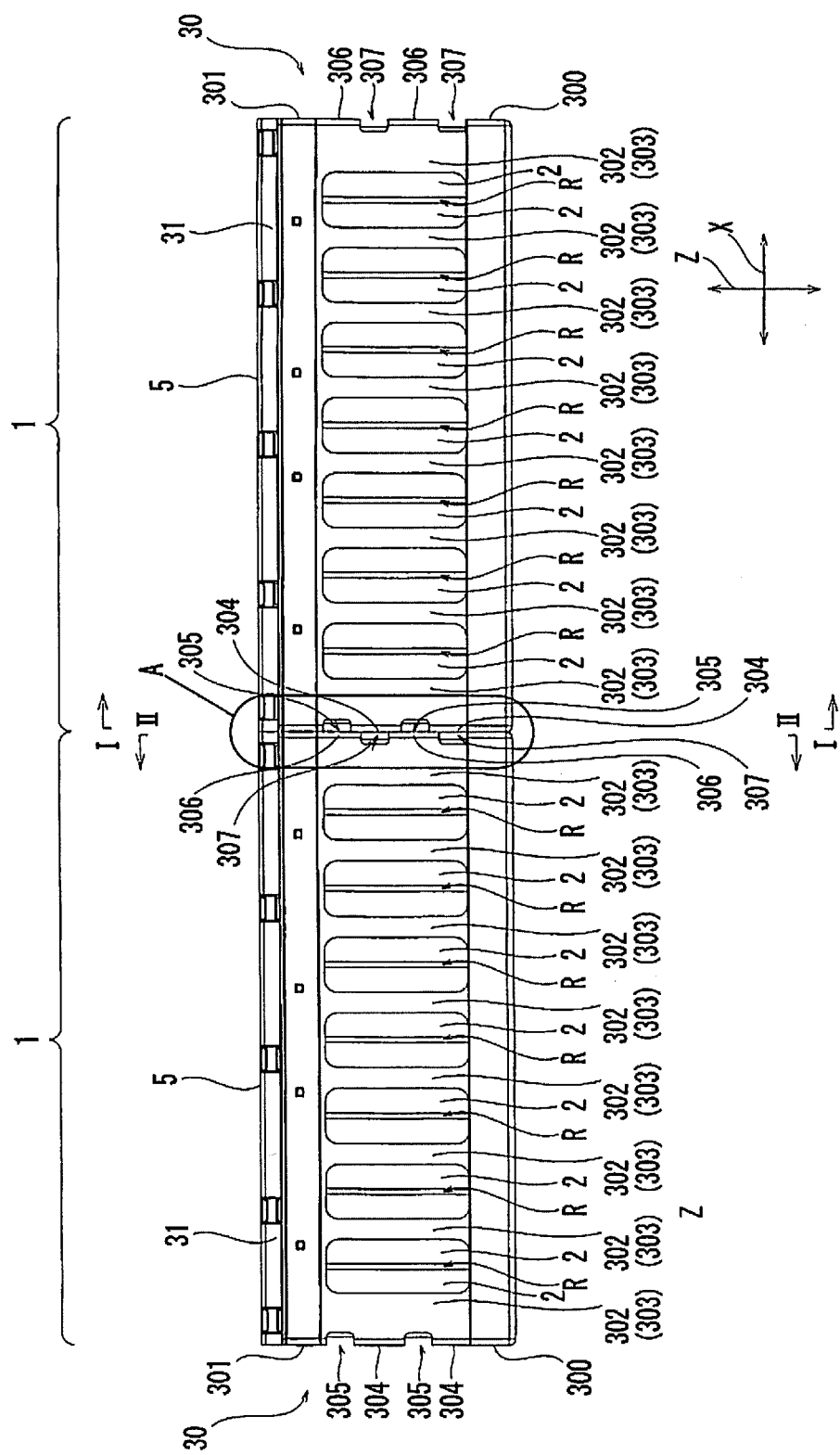
FIG. 7 is a front view seen from the Y direction with two cell modules relating to the same embodiment being placed side by side.

Further, when a plurality of cell modules 1, . . . are mounted as the power source for a piece of equipment, as shown in FIG. 7, a plurality of cell modules 1, . . . are disposed being aligned in the X direction such that the respective single cells 2, . . . are lined up in the X direction. Furthermore, in this configuration as well, one pair of air passages A1, A2 are disposed at both sides in the Y direction of the plurality of cell modules 1, . . . which are disposed in one line.

Moreover, as described above, when a plurality of cell modules 1, . . . are disposed to be aligned in the X direction, they are disposed such that the first wall portion 304 and the first air vent portion 305 of one cell module 1 of adjacent two cell modules 1, 1 face the second wall portion 306 and the second air vent portion 307 of the other cell module 1.

As described above, in each of the plurality of cell modules 1, . . . , the first wall portion 304 and the second wall portion 306 are disposed to be relatively deviated in position in the Z direction. Moreover, the disposition of the first air vent portion 305 corresponds to that of the second wall portion 306, and the disposition of the second air vent portion 307 corresponds to that of the first wall portion 304.

Figure 8:
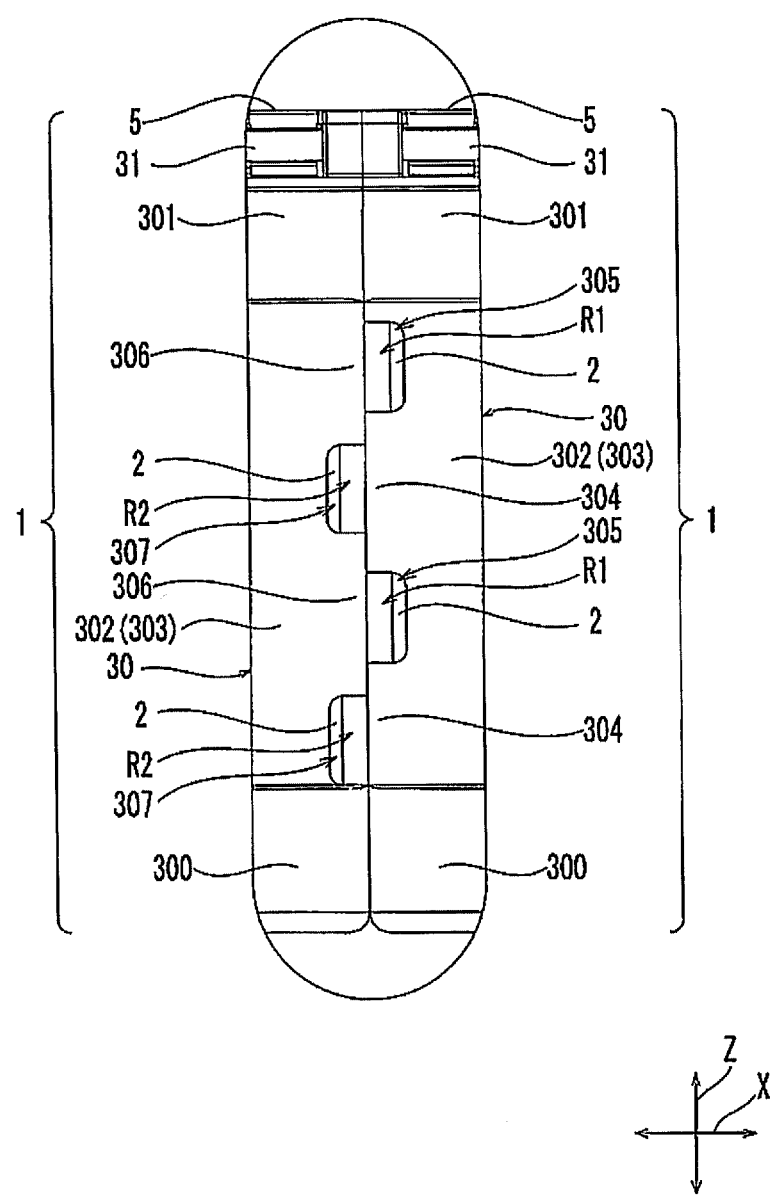
FIG. 8 is an enlarged view of the A section of FIG. 7.

As a result of that, as shown in FIG. 8, the first wall portion 304 of one cell module 1 of adjacent two cell modules 1, 1 is overlapped with the second air vent portion 307 of the other cell module 1; and the second wall portion 306 of the other cell module 1 is overlapped with the first air vent portion 305 of the one cell module 1.

Thus, an area opened to the outside of the first air vent portion 305 in the one cell module 1 is blocked by the second wall portion 306 in the other cell module 1. Moreover, an area opened to the outside of the second air vent portion 307 in the other cell module 1 is blocked by the first wall portion 304 in the one cell module 1.

Figure 9:
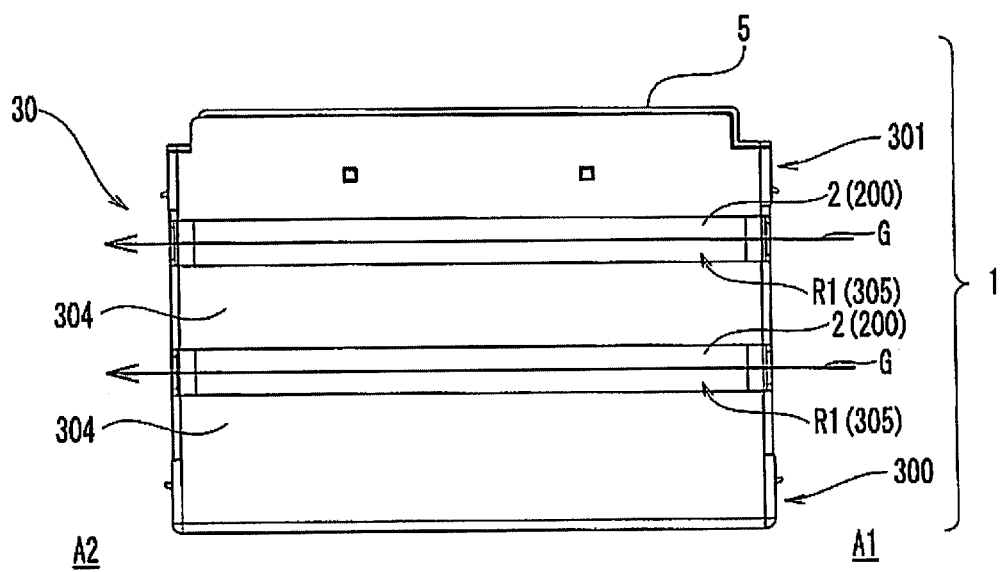
FIG. 9 is a sectional view taken along I-I in FIG. 7, showing a sectional view including a circulation state of gas in a first inter-module air passage.

In this state, the first air vent portion 305 in the one cell module 1 becomes a first inter-module air passage R1 which is opened only at the single cell 2 side in one cell module 1 in the X direction, and opened at both sides in the Y direction. As a result of this, as shown in FIG. 9, the first inter-module air passage R1 is formed such that gas can be circulated in the Y direction while the gas is kept in contact with the first flat plate portion 200 of the single cell 2 which is located at one side in the X direction in one cell module 1, as with the inter-cell air passage R of the one cell module 1. In the present embodiment, since the first air vent portion 305 is formed at two locations as described above, the first inter-module air passage R1 as well is formed at two locations to be spaced apart from each other in the Z direction.

Figure 10:
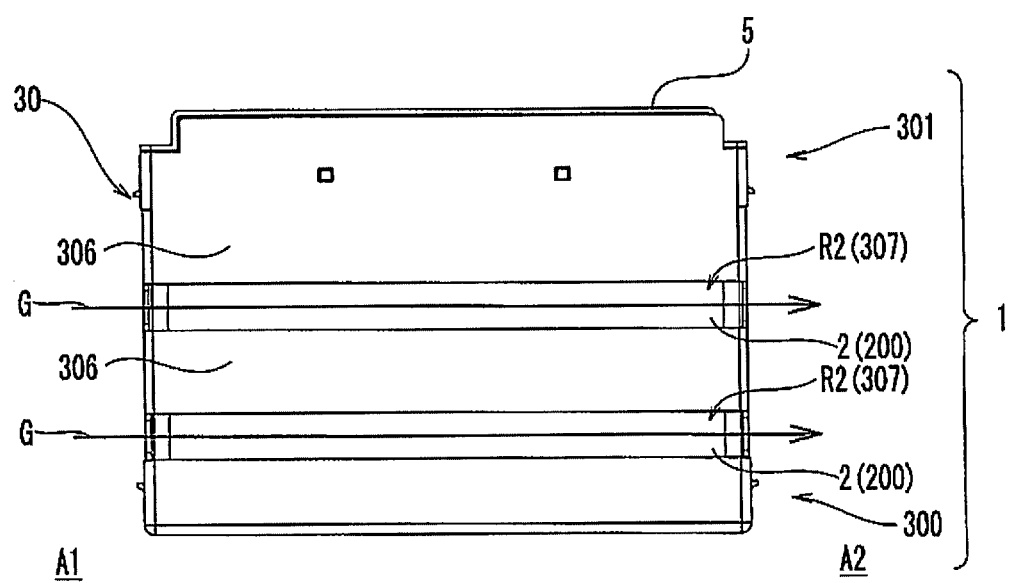
FIG. 10 is a sectional view taken along II-II in FIG. 7, showing a sectional view including a circulation state of gas in a second inter-module air passage.
Figure 10:
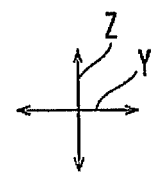

The second air vent portion 307 in the other cell module 1 becomes a second inter-module air passage R2 which is opened only at the single cell 2 side in the other cell module 1 in the X direction, and opened at both sides in the Y direction. As a result of this, as shown in FIG. 10, the second inter-module air passage R2 in the other cell module 1 is formed such that gas can be circulated in the Y direction while the gas is kept in contact with the first flat plate portion 200 of the single cell 2 which is located at other side in the X direction in the other cell module 1, as with the inter-cell air passage R of the other cell module 1. In the present embodiment, since the second air vent portion 307 is formed at two locations as described above, the second inter-module air passage R2 as well is formed at two locations to be spaced apart from each other in the Z direction.

Therefore, the gas that circulates in the first inter-module air passage R1 cools only the single cell 2 located at one side in the X direction in one cell module 1. In particular, as a result of the first inter-module air passage R1 being formed at multiple locations, the whole range of (the first flat plate portion 200 of) the case 20 of the single cell 2 is efficiently cooled. Further, the gas that circulates in the second inter-module air passage R2 cools only the single cell 2 located at other side in the X direction in the other cell module 1. In particular, as the result of the second inter-module air passage R2 being formed at multiple locations, the whole range of (the first flat plate portion 200 of) the case 20 of the single cell 2 is efficiently cooled.

Thus, when a plurality of cell modules 1, . . . are mounted as the power source of a piece of equipment, it is possible to smoothly circulate gas in such a state that the gas can cool each of the single cells 2, . . . of adjacent cell modules 1, 1. Further, since the first air vent portion 305 and second air vent portion 307, which are formed respectively in adjacent cell modules 1, 1, do not overlap one another, the air passage will not be formed into an unnecessarily large size.

Therefore, each of mutually facing single cells 2, 2, which are single cells 2, 2 of adjacent cell modules 1, 1, can be prevented from being cooled more than necessary. As a result of this, there will be no difference in the cooling state between the two single cells 2, 2 which are located at both ends in the X direction, and single cells 2, . . . which are located between the aforementioned two single cells 2, 2. That is, each of the plurality of single cells 2, . . . in the cell module 1 is cooled in good balance.

Therefore, the service life of each of the plurality of single cells 2, . . . is made uniform, thereby allowing stable power supply. That is, an excellent effect can be achieved in that when a plurality of cell modules 1, . . . are disposed to be aligned, a plurality of single cells 2, . . . in each cell module 1 can be cooled generally in good balance.

Further, as described above, the sizes in the X and Z directions of the first air vent portion 305 and the second air vent portion 307 are set such that the cross-sectional area of the first inter-module air passage R1 seen from the Y direction and the cross-sectional area of the second inter-module air passage R2 seen from the Y direction are the same, or substantially the same. This allows the flow rate of the gas that circulates in the first inter-module air passage R1 and the flow rate of the gas that circulates in the second inter-module air passage R2 to be made uniform or substantially uniform. This allows adjacent single cells 2, 2, which are single cells 2, . . . of adjacent cell modules 1, 1, to be cooled at an equal or substantially equal conditions. Therefore, a plurality of single cells 2, . . . in each of a plurality of cell modules 1, 1 can be cooled at an equal condition, thereby allowing stable power supply.

In particular, the sizes in the X and Z directions in each of the first air vent portion 305 and the second air vent portion 307 are set such that the cross-sectional areas of the first inter-module air passage R1 and the second inter-module air passage R2 seen from the Y direction are the same or substantially the same as those of respective inter-cell air passages R seen from Y direction. This allows the flow rates of the gas that circulates in the first inter-module air passage R1, the second inter-module air passage R2, and the inter-cell air passage R to be made equal or substantially equal to each other. Therefore, all of the plurality of single cells 2, . . . in the cell module 1 can be cooled at the same or substantially the same conditions.

It is a matter of course that the present invention will not be limited to the above described embodiments, and can be appropriately modified within a range not departing from the spirit of the present invention.

Although, in the above described embodiments, the first wall portion 304, the first air vent portion 305, the second wall portion 306, and the second air vent portion 307 are respectively provided in multiple numbers, this will not limit the present invention. For example, one for each of the first wall portion 304, the first air vent portion 305, the second wall portion 306 and the second air vent portion 307 may be provided. Further, three or more for each of the first wall portion 304, the first air vent portion 305, the second wall portion 306 and the second air vent portion 307 may be provided. In such a configuration as well, it is preferable that the first wall portion 304 and the second wall portion 306 are deviated in position from each other in the Z direction; the disposition of the first wall portion 304 corresponds to that of the second air vent portion 307; and the disposition of the second wall portion 306 corresponds to that of the first air vent portion 305.

Although, in the above described embodiments, the number of the first wall portions 304 and that of the second wall portions 306 are set to be the same number, this will not limit the present invention. Provided that the numbers and dispositions of the first wall portion 304 and the second air vent portions 307 correspond to each other, and the numbers and dispositions of the second wall portions 306 and the first air vent portions 305 correspond to each other, the number of the first wall portions 304 may differ from that of the second wall portions 306. For example, when two of the first air vent portions 305, 305 are provided at both sides of the first wall portion 304, the configuration may be such that two of the second wall portions 306, 306 are provided at both sides of the second air vent portion 307. Even with such a configuration, since the first air vent portions 305, 305 and the second wall portions 306, 306 are disposed in a corresponding manner, and the first wall portion 304 and the second air vent portion 307 are disposed in a corresponding manner, a portion opened to the outside in the first direction of each of the two first air vent portions 305, 305 will be blocked by each of the two second wall portions 306, 306 and thereby a first inter-module air passage R1 is formed. Further, a portion opened to the outside in the first direction of the second air vent portion 307 is blocked by the first wall portion 304 so that a second inter-module air passage R2 is formed.

Although, in the above described embodiments, the bottom portion 300 of the holder body 30 includes the bottom body 300*a* and the bottom frame portion 300*b*, this will not limit the present invention. For example, the bottom portion 300 may be made up of a bottom body 300*a* alone which can carry a plurality of single cells 2, . . . . Further, although in the above described embodiments, a plurality of spacers 300*c*, . . . for keeping a space between adjacent single cells 2, 2 are provided in the bottom portion 300, this will not limit the present invention. For example, the configuration may be such that each of the plurality of first column portions 302, . . . and each of the plurality of second column portions 303, . . . are disposed in a corresponding manner, and the spacer to be disposed between adjacent single cells 2, 2 is constructed over between the first column portion 302 and the second column portion 303 which correspond to each other. In this configuration, it is a matter of course that the spacer is disposed so as not to impair the formation of the inter-cell air passages R.

Although, in the above described embodiments, each of the column portion 302 and the column portion 303 for connecting the bottom portion 300 and the frame portion 301 is provided in multiple numbers, this will not limit the present invention. The number of each of the column portion 302 and the column portion 303 to be provided may be at least one provided that they can connect the bottom portion 300 and the frame portion 301. Therefore, at least one for each of the first column portion 302 and the second column portion 303 may be provided. It is a matter of course that even in such a configuration, the column portions 302, 303 are disposed so as not to be opposed to the inter-cell air passage R. Further, although in the above described embodiments, the first column portion 302 and the second column portion 303 are provided, it is not necessary to provide both of them.

Although, in the above described embodiments, configuration is made such that based on the configuration that cell modules 1 having the same form are disposed in one line, the first wall portion 304 and the second wall portion 306 are disposed to be relatively deviated in position in the Z direction so that the first wall portion 304 of one cell module 1 and the second air vent portion 307 of the other cell module 1 overlap one another, and the first air vent portion 305 of one cell module 1 and the second wall portion 306 of the other cell module 1 overlap one another, such a configuration will not limit the present invention. For example, based on the configuration that two kinds of cell modules 1, 1 are alternately disposed, the configuration may be such that the first wall portion 304 and the second wall portion 306 are disposed at the same level in the Z direction. In this case, by disposing the first wall portion 304 and the second wall portion 306 of one cell module 1 to be deviated in the third direction with respect to the first wall portion 304 and the second wall portion 306 of the other cell module 1 adjacent thereto, it is made possible that the first wall portion 304 of one cell module 1 overlaps the second air vent portion 307 of the other cell module 1, and the first air vent portion 305 of the one cell module 1 overlaps the second wall portion 306 of the other cell module 1.

Although, in the above described embodiments, the configuration is made such that the first wall portion 304 of one cell module 1 of adjacent cell modules 1, 1 overlaps the entire second air vent portion 307 of the other cell module 1, and the second wall portion 306 of the other cell module 1 overlaps the entire first air vent portion 305 of the one cell module 1 of the adjacent cell modules 1, 1, such a configuration will not limit the present invention. For example, the configuration may be such that at least a part of the first wall portion 304 of one cell module 1 overlaps the second air vent portion 307 of the other cell module 1; and a part of the second wall portion 306 of the other cell module 1 overlaps the first air vent portion 305 of the one cell module 1. Even if such a configuration is made, it is possible to smoothly circulate gas in the Y direction in each of the first air vent portion 305 and the second air vent portion 307, thus allowing the cooling of the single cells 2, 2 which are located at ends in the first direction.

Although, in the above described embodiments, the basic configuration is that cell modules 1 having the same structure are aligned in the X direction, the present invention is not limited thereto, and, for example, when one cell module 1 is considered, the relative disposition between the first wall portion 304 and the second wall portion 306 can be appropriately modified. Even if the disposition of the first wall portion 304 does not correspond to that of the second wall portion 306, each of the first air vent portion 305 and the second air vent portion 307 functions as an air passage for circulating gas in the Y direction, thereby allowing the single cell 2 which is located at one end in the X direction to be appropriately cooled.

Although, in the above described embodiments, the first wall portion 304 and the first air vent portion 305 are disposed side by side in the third direction, and the second wall portion 306 and the second air vent portion 307 are disposed side by side in the third direction, this will not limit the present invention. For example, if either one of the two single cells 2, 2, which are located at the ends in the X direction, can obtain a sufficient heat dissipation effect by being connected to the bus bar 4, the configuration may be such that either one of the first wall portion 304 and the second wall portion 306 is provided, as well as the first air vent portion 305 or the second air vent portion 307, which is adjacent to either one of the first wall portion 304 and the second wall portion 306 in the third direction, is provided.

Although, in the above described embodiments, the cross-sectional areas seen from the Y direction of the first inter-module air passage R1 and the second inter-module air passage R2 are set to be the same or substantially the same as the cross-sectional area as seen from the second direction of each inter-sell air passage R, this will not limit the present invention. For example, the configuration may be such that single cells 2, 2 which are located at the middle in the X direction are disposed with a larger space therebetween such that the cross-sectional area as seen from the Y direction of the inter-cell air passage R located at the middle in the X direction is larger than the cross-sectional area as seen from the Y direction of the other inter-cell air passages R and the cross-sectional area as seen from the Y direction of the first inter-module air passage R1 and the second inter-module air passage R2. According to such a configuration, it is possible to effectively cool the single cells 2, 2 which are located at the middle in the X direction and which has a high degree of heat generation among the plurality of single cells 2, . . . in the electric storage apparatus. Furthermore, it is a matter of course that the inter-cell air passage R for which the above described countermeasure is taken is not limited to the one inter-cell air passage R located at the middle in the X direction, but may be a certain number of inter-cell air passages R which are located in the middle in the X direction.

Further, each single cells 2 may be disposed to be closer to each other such that the cross-sectional area as seen from the Y direction of the inter-cell air passage R is smaller than the cross-sectional areas of the first inter-module air passage R1 and the second inter-module air passage R2 seen from the Y direction. According to such a configuration, although the flow rate of the gas that circulates in each inter-cell air passage R is less than the flow rate of the gas that circulates in the first inter-module air passage R1 and the second inter-module air passage R2, it is possible to prevent foreign bodies from being mixed into between the single cells 2, 2, thus preventing shorting between the single cells 2, 2.

In the above described embodiments, description has been made on a lithium ion secondary cell. However, the kind and size (capacity) of the cell is arbitrary.

The present invention will not be limited to a lithium ion secondary cell. The present invention is applicable to various secondary cells, as well as primary cells, and capacitors such as electric double layer capacitors.

The invention claimed is:

1. An electric storage apparatus, comprising:
  a plurality of electric storage devices electrically connected with each other; and
  a holder for holding the plurality of electric storage devices,
  wherein the plurality of electric storage devices are aligned in a first direction, and are disposed to be spaced apart from an adjacent electric storage device with a space in the first direction to form an inter-electric storage device air passage passing through in a second direction, orthogonal to the first direction, between adjacent electric storage devices,
  wherein the holder includes a holder body which is configured to accommodate the plurality of electric storage devices, and
  wherein the holder body includes:
    at least one wall portion extending in the second direction, the at least one wall portion being opposed to one of the electric storage devices located at one end in the first direction among the plurality of electric storage devices; and
    an air vent portion formed side by side with the at least one wall portion in a third direction, the third direction being orthogonal to the first and second directions, the air vent portion extending in the second direction on the one of the electric storage devices located at the one end, and the air vent portion extending over an entire dimension in the second direction of the one of the electric storage devices and being opened to the first and second directions.

2. The electric storage apparatus according to claim 1, wherein the holder body includes two holder bodies, and
wherein, in a state in which the two holder bodies are disposed side by side in the first direction, the wall portion and the air vent portion of one of the two holder bodies are configured to face the wall portion and the air vent portion of another one of the two holder bodies.

3. The electric storage apparatus according to claim 2, wherein at least a part of the wall portion of the one of the two holder bodies is opposed to the air vent portion of the another one of the two holder bodies, and the air vent portion of the one of the two holder bodies is opposed to at least a part of the wall portion of the another one of the two holder bodies.

4. The electric storage apparatus according to claim 2, wherein the wall portion of the one of the two holder bodies is opposed to the air vent portion of the another one of the two holder bodies, and the air vent portion of the one of the two holder bodies is opposed to the wall portion of the another one of the two holder bodies.

5. The electric storage apparatus according to claim 4, wherein the at least one wall portion comprises a plurality of wall portions provided to be spaced apart from each other in the third direction,
wherein the air vent portion comprises a plurality of air vent portions provided such that each of the plurality of air vent portions lies side by side with each of the plurality of wall portions in the third direction, and
wherein said each of the plurality of wall portions of the one of the two holder bodies is opposed to said each of the plurality of air vent portions of the another one of the two holder bodies, and said each of the plurality of air vent portions of the one of the two holder bodies is opposed to said each of the plurality of wall portions of the another one of the two holder bodies.

6. The electric storage apparatus according to claim 5, wherein, in each of the two holder bodies, the plurality of wall portions and the plurality of air vent portions are provided at each of both sides in the first direction of the plurality of electric storage devices,
wherein the plurality of wall portions and the plurality of air vent portions, which are opposed to the one electric storage device located at the one end in the first direction among the plurality of electric storage devices, and the plurality of wall portions and the plurality of air vent portions, which are opposed to another electric storage device located at another end in the first direction among the plurality of electric storage devices are formed to be relatively deviated in position in the third direction, and
wherein each of the plurality of wall portions opposed to the one electric storage device is formed at a position corresponding to each of the plurality of air vent portions opposed to the another electric storage device, and each of the plurality of air vent portions opposed to the one electric storage device is formed at a position corresponding to each of the plurality of wall portions opposed to the another electric storage device.

7. The electric storage apparatus according to claim 1, wherein another wall portion and another air vent portion are opposed to another electric storage device located at another end in the first direction among the plurality of electric storage devices,
wherein the wall portion and the air vent portion, which are opposed to the one electric storage device located at the one end in the first direction among the plurality of electric storage devices, and the another wall portion and the another air vent portion, which are opposed to the another electric storage device located at the another end in the first direction among the plurality of electric storage devices are formed to be relatively deviated in position in the third direction, and
wherein at least a part of the wall portion opposed to the one electric storage device is formed at a position corresponding to the another air vent portion opposed to the another electric storage device, and the air vent portion opposed to the one electric storage device is formed at a position corresponding to at least a part of the another wall portion opposed to the another electric storage device.

8. The electric storage apparatus according to claim 1, wherein the holder body comprises a plurality of holder bodies, and
wherein a cross-sectional area as seen from the second direction of an air passage formed by the air vent portion of one of the holder bodies is the same or substantially the same as a cross-sectional area as seen from the second direction of an air passage formed by the air vent portion of another one of holder bodies.

9. The electric storage apparatus according to claim 1, wherein a cross-sectional area, as seen from the second direction, of an air passage formed by the air vent portion is the same or substantially the same as a cross-sectional area, as seen from the second direction, of the inter-electric storage device air passage.

10. The electric storage apparatus according to claim 1, wherein a width of the air vent portion in the third direction is constant in the second direction.

11. The electric storage apparatus according to claim 1, wherein the holder further comprises a hold member which is disposed on the plurality of electric storage devices accommodated in the holder body.

12. The electric storage apparatus according to claim 1, wherein the air vent portion extends in the second direction to a surface of the holder body that extends in the first direction.

13. The electric storage apparatus according to claim 12, wherein the air vent portion extends in the second direction to another surface of the holder body that extends in the first direction.

14. The electric storage apparatus according to claim 1, wherein an inner surface of the at least one wall portion, which faces the one of the electric storage devices, includes a rib that extends in the third direction.

15. The electric storage apparatus according to claim 14, wherein, in the third direction, the air vent portion splits the rib such that a surface of the air vent portion, which faces the one of the electric storage devices, is devoid of the rib.

* * * * *